United States Patent [19]

Fisher

[11] Patent Number: 4,521,937
[45] Date of Patent: Jun. 11, 1985

[54] HINGE COMPRISING AN ARCUATE SPADE MEMBER AND AN ARCUATE SOCKET

[75] Inventor: Sidney E. Fisher, Birmingham, England

[73] Assignee: Britax Weathershields Limited, England

[21] Appl. No.: 504,281

[22] Filed: Jun. 14, 1983

[30] Foreign Application Priority Data

Jun. 25, 1982 [GB] United Kingdom ............... 8218536
Feb. 14, 1983 [GB] United Kingdom ............... 8303953

[51] Int. Cl.³ .................... E05D 11/10; E05D 1/04
[52] U.S. Cl. .................................. 16/332; 16/355; 16/DIG. 29; 296/217; 296/218
[58] Field of Search ............. 16/332, 334, 335, 352, 16/355, 356, 362, DIG. 6, DIG. 29; 296/217, 218

[56] References Cited

U.S. PATENT DOCUMENTS 2,964,351 12/1960 White ........................ 16/355 X
4,226,052 10/1980 De Stephano ............. 296/218 X
4,342,481 8/1982 Kanou et al. .................. 296/217
4,408,795 10/1983 Saitoh et al. .................. 296/218

FOREIGN PATENT DOCUMENTS 49983 4/1982 European Pat. Off. .
8400 12/1899 Norway ......................... 16/332
1252931 11/1971 United Kingdom ........... 16/355

Primary Examiner—Fred A. Silverberg
Attorney, Agent, or Firm—Hayes, Davis & Soloway

[57] ABSTRACT

A hinge for an opening roof panel for a vehicle comprises a spade member and a socket. The spade member is secured to the one surface of the panel with an arcuate portion projecting in an arc centered on the desired hinge axis. The socket is secured to the frame and has an open-ended arcuate channel, centered on the desired hinge axis, at least one wall of the channel being formed by a wall member mounted on a resilient member which, when relaxed, causes the width of the part of the channel to be less than the thickness of the arcuate portion of the spade member. The hinge can also be used to secure a draught deflector to the front edge of the aperture in the vehicle roof when the panel has been completely removed.

6 Claims, 9 Drawing Figures

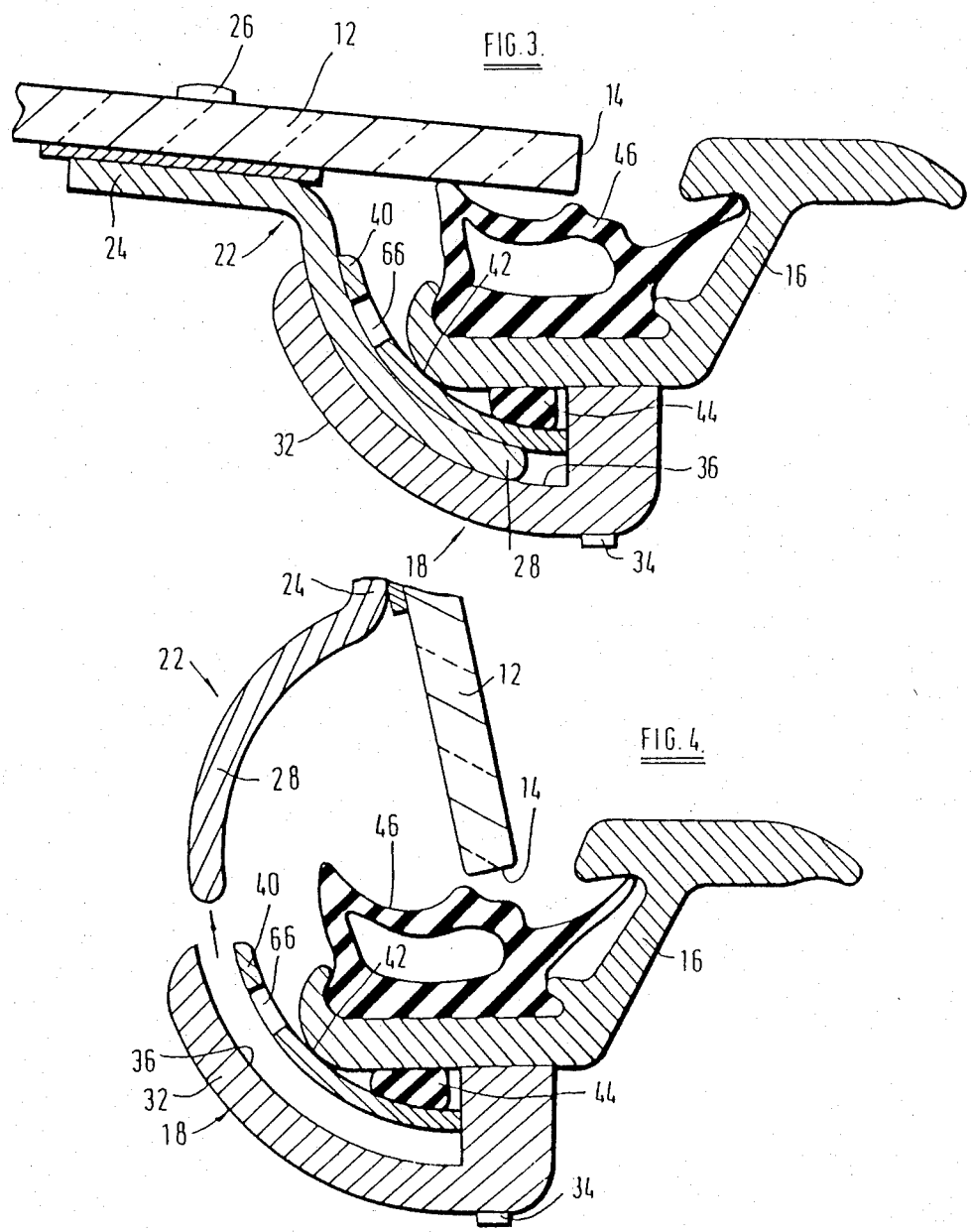

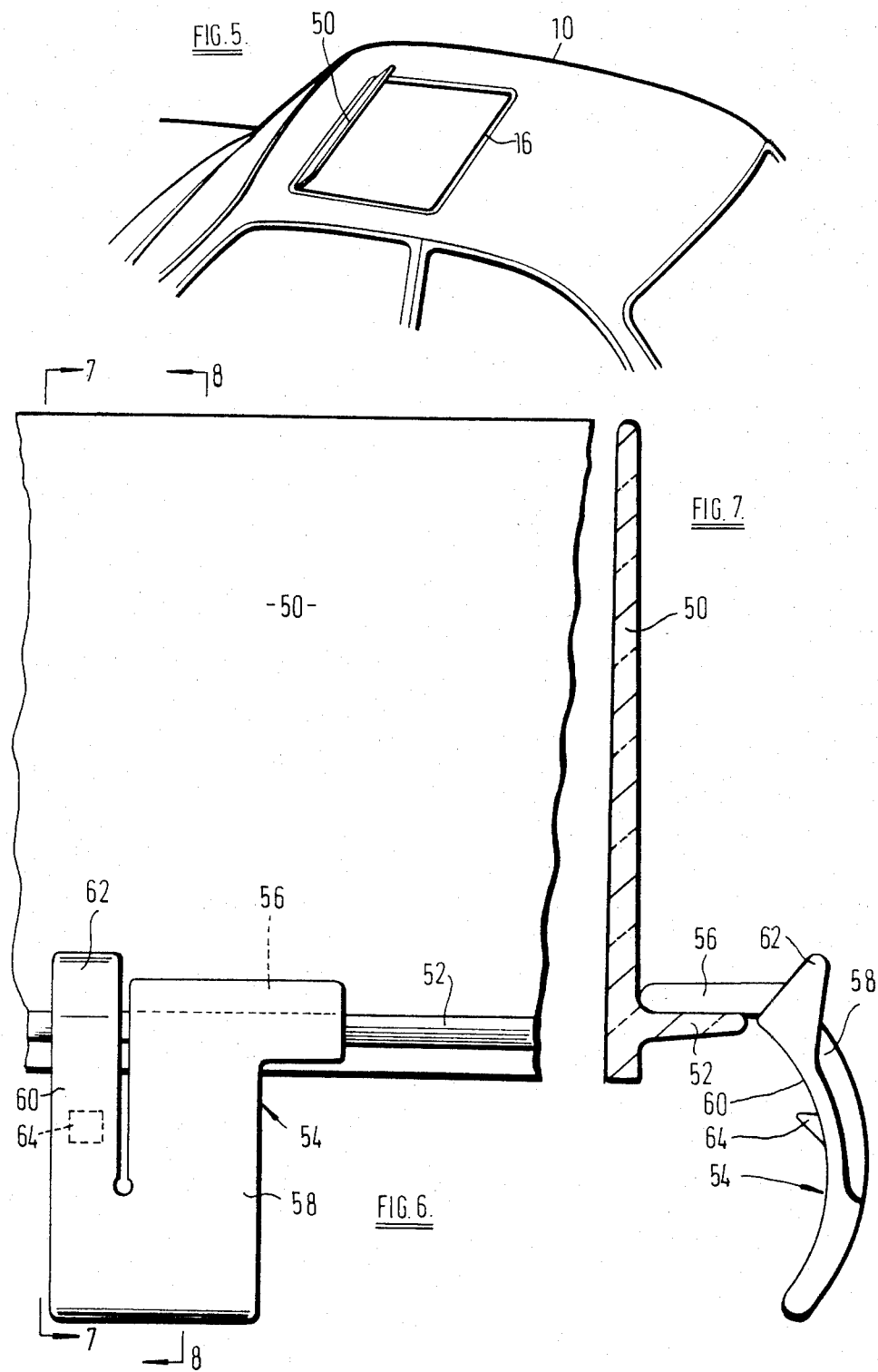

HINGE COMPRISING AN ARCUATE SPADE MEMBER AND AN ARCUATE SOCKET

This invention relates to hinges for panels intended to close an opening in a structure and more particularly to hinges for panels of the foregoing type in which the panel is moveable between a closed and a normal fully opened position but with provision for opening beyond the normal fully opened position.

The invention is particularly, but not exclusively, applicable to opening roofs for vehicles of the kind in which a frame is provided for surrounding an aperture in the roof of a vehicle and a rigid panel, conveniently of glass, is hinged to the forward edge of the frame and is coupled to the rear edge of a latch which is releaseable to enable the panel to be hinged into a normal open position. In such opening roofs, the hinges are frequently constructed so as to allow the panel to be completely removed from the frame. An opening roof of this type is described in U.S. Pat. No. 4,067,605 in which the hinges consist of spade members or so-called bayonets secured to the lower surface of the panel with their free ends received in slots in the frame. When the panel is closed, a seal round the edge of the frame is compressed. It is necessary for the hardness of the seal along the front edge of the frame to be sufficient to stop the hinges from rattling.

A seal of such hardness imposes an unusually large upward force on those parts of the edges of the panel which are remote from the hinges and the latch. In addition, it is difficult, with such an arrangement, to successfully prevent rattling when the panel is in its open position.

According to the invention a hinge for mounting a panel in an opening comprises a spade member being secured to the one surface of the panel and a socket portion secured to an edge of the opening, the spade member having an arcuate portion projecting from said surface in an arc centred on the desired hinge axis, and the socket portion having an open-ended arcuate channel, centred on said desired hinge axis, at least one wall of said channel being formed by a wall member mounted on resilient means which, when relaxed, causes the width of the part of said channel to be less than the thickness of the arcuate portion of the spade member.

Preferably the wall member is pivoted at an intermediate point on a rigid fulcrum spaced from the other wall of the channel by a distance such that the spade member is a sliding fit therein, and the resilient means is arranged to pivot the wall member on said fulcrum so as to reduce the width of the inner end of the channel and increase the width of the outer end thereof, thereby providing a splayed mouth for receiving the free end of the spade member when the panel is inserted into the frame.

Hinges in accordance with the invention can also be used to secure a draught deflector to the front edge of the aperture in the vehicle roof when the panel which normally closes the aperture has been completely removed. Such a draught deflector comprises a panel mounted on the spade members of hinges in accordance with the invention, each such spade members being provided with resilient detent means adapted to engage with a complementary formation on the socket portion of the hinge when the draught deflector is in its position of use.

An embodiment of the invention will now be described, by way of example, with reference to the accompanying drawings, in which:

FIG. 3 is a cross-sectional view similar to FIG. 1 but with the opening roof in its normal open position;

FIG. 4 is a cross-sectional view, similar to FIGS. 2 and 3 but just after separation of the two parts of the hinge from one another;

FIG. 5 is a perspective view, similar to FIG. 1 but showing a draught deflector in place of the normal closure panel;

FIG. 6 is a segmentary elevational view showing part of the draught deflector of FIG. 5 together with the spade member of one of the hinges;

FIG. 7 is a cross-sectional view, taken on the line 7—7 in FIG. 6;

Figure 1:
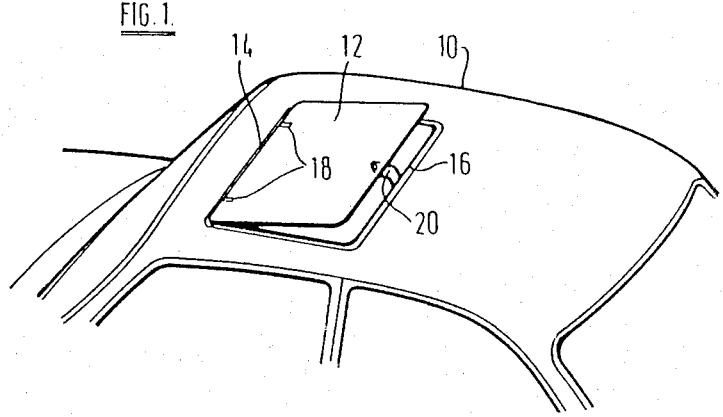
FIG. 1 is a perspective view of the top of a motor car fitted with an opening roof of the type referred to above.

Referring to FIG. 1, a motor car 10 has an opening roof comprising a panel 12 hinged along its leading edge 14 to a frame 16 bounding an aperture in the roof of the vehicle 10. The hinges 18 are constructed so as to permit the panel 12 to be unhooked after it has been opened well beyond its normal open position, as shown in FIG. 1. A latch 20 at the rear of the panel 12 is arranged to hold the panel 12 either in the normal open position, as illustrated, or in the fully closed position and also allow complete removal of the panel 12. The latch 20 may be as described in our Specification EP-A-0049983.

Figure 2:
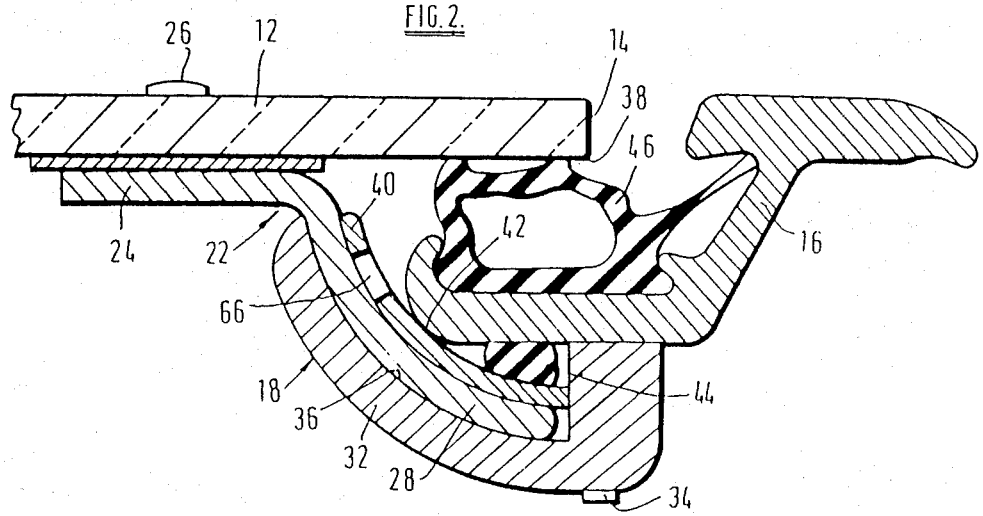
FIG. 2 is a cross-sectional view of a hinge in accordance with the invention fitted to the opening roof illustrated in FIG. 1, the roof being in the closed position.

Referring now to FIGS. 2, 3 and 4, each of the hinges 18 is formed in two parts. One part consists of a spade member 22 having a flat portion 24 secured to the panel 12 by the bolt 26. An arcuate portion 28 projects downwardly from one end of the portion 24 in an arch centred on the bottom corner 30 of the front edge 14 of the panel 12.

The other part of the hinge 18 comprises a socket 32 secured to the bottom surface of the frame 16 by a bolt 34. The socket 32 has a concave arcuate surface 36 centred on the edge 38 when the panel 12 is installed in the frame 16. An arcuate wall member 40 is located with its concave surface abutting a corner 42 of the frame and its convex surface confronts the concave surface 36 of the socket 32.

The thickness of the wall member 40 is such that the arcuate portion of the spade member 22 is a sliding fit between the wall member 40 and the concave surface 36 at the location level with the abutting corner 42 of the frame 16. A resilient synthetic rubber block 44 is located between the concave surface of the inner end of the wall member 40 and the lower surface of the frame 16 and is bonded to both of these surfaces in order to retain the wall member 40 in position.

A resilient synthetic rubber seal member 46 engages between a horizontal upwardly facing surface of the frame 16 and the lower surface of the panel 12. When the panel is in this closed position, as shown in FIG. 2, the arcuate portion 28 of the spade member 22 extends along almost the whole of the length of the channel between the wall member 40 and the concave surface 36, compressing the rubber block 44. The seal 46 exerts a sufficient force on the panel 12 to ensure that the joint is watertight but this force need not be as great as that exerted by the rubber block 44.

Turning to FIG. 3, when the roof is hinged to its open position, the free end of the arcuate portion 28 of the spade 22 still projects beyond the fulcrum provided by the corner 42 so that the rubber block 44 is still compressed by the arcuate member 40. Consequently both when the roof is in this position and when it is in the fully closed position shown in FIG. 2, the roof block 42 exerts sufficient force on the various parts of the hinge to prevent rattling. However, when the roof is in the position in FIG. 3, it makes only light contact with the seal 46.

Turning to FIG. 4, when the panel 12 is to be completely removed from the frame 16, the arcuate portion of the space 22 is withdrawn from the channel between the concave surface 36 and the arcuate member 40. As soon as the free end of the spade 22 passes the fulcrum 42, the rubber block 44 relaxes, displacing the inner end of the arcuate member 38 downwardly so as to increase the width of the outer end of the channel. This facilitates re-insertion of the free end of the spade member 22 when the panel 12 is to be replaced in the frame 16.

FIG. 5 shows the motor car 10 with the panel 12 completely removed and replaced by a draught deflector 50 which extends across the front edge of the frame 16.

Turning to FIGS. 6 and 7, the draught deflector 50 comprises a flat panel of transparent plastics material with a perpendicularly projecting rib 52 adjacent to its front or lower edge. Attached to the rib 52 are a pair of spade members 54 (only one of which is shown in FIGS. 6 and 7) for engagement in the sockets 32 of the two hinges 18 (FIG. 1). Each of the spade members 54, which are formed from a resilient plastics material, has a flat portion 56, which is welded to the rib 52, and an arcuate portion 58. Extending generally parallel to the arcuate portion 58 is a resilient finger 60 which carries a protuberance 62 on its free end projecting radially outwardly from the arcuate portion 58 adjacent to its junction with the flat portion 56. The finger 60 also carries a radially inwardly directed detent 64.

Figure 8:
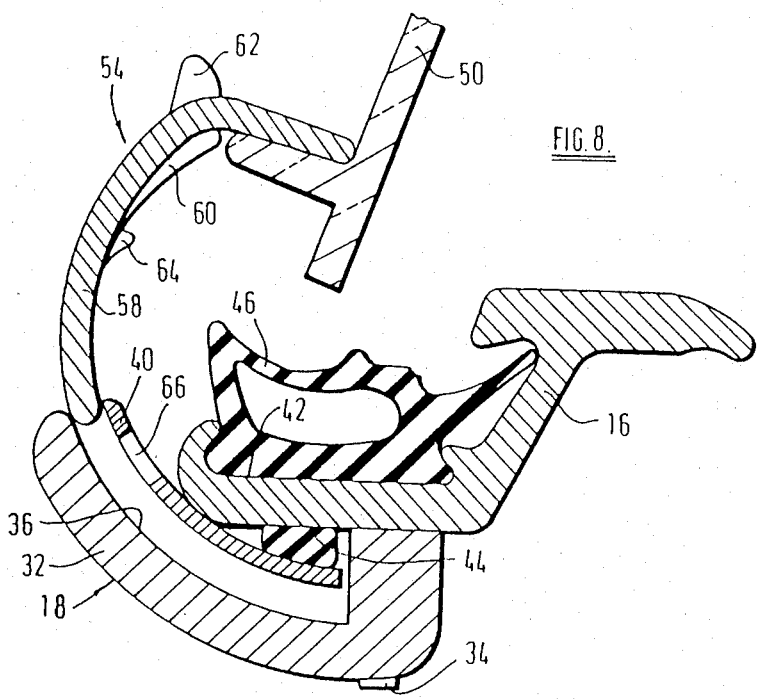
FIG. 8 is a cross-sectional view, taken on the line 8—8 in FIG. 6 and also showing the socket portion of the hinge just prior to insertion of the spade portion therein.
Figure 9:
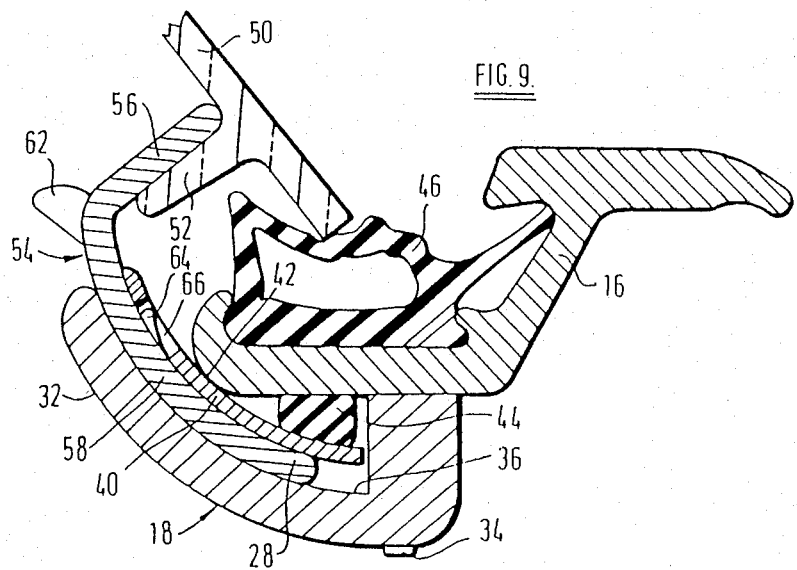
FIG. 9 is a cross-sectional view, similar to FIG. 8 with the draught deflector in its position of normal use.

Turning to FIGS. 8 and 9, when the draught deflector 50 is to be fitted in its position of use, the arcuate portion 58 of the two spade members 54 are aligned with the channels between the concave surfaces 36 and the arcuate members 38 of the two hinges 18 and then slid therein. When the two arcuate portions are fully received in these channels, the detents 64 spring into engagement with respective slots 66 in the two arcuate members 40 so as to retain the draught deflector in its installed position. The clicks produced by this snap-in action provide an audible indication that the draught deflector 50 is correctly located.

When it is desired to remove the draught deflector 50, the protuberances 62 are pressed downwardly, as viewed in FIG. 9, so as to displace the two detents 64 out of their respective slots 66. The arcuate portions 58 of the two spade members 54 are then free to slide out of their respective channels. The two-handed action required to free both detents 64 provides security against inadvertent disengagement of the draught deflector 50.

I claim:

1. A hinge for mounting a panel in an opening comprising a spade member secured to one surface of the panel and a socket portion secured to an edge of the opening, the spade member having an arcuate portion projecting from said surface in an arc centred on a desired hinge axis, and the socket portion having an open-ended arcuate channel, centred on said desired hinge axis and at least one wall of said channel being formed by a wall member mounted on resilient means which, when relaxed, causes the width of the part of said channel to be less than the thickness of the arcuate portion of the spade member, the wall member being pivoted at an intermediate point on a rigid fulcrum spaced from a wall of the channel opposite to the wall member by a distance such that the spade member is a sliding fit therein, and the resilient means is arranged to pivot the wall member on said fulcrum so as to reduce the width of the inner end of the channel and increase the width of the outer end thereof.

2. A hinge according to claim 1, wherein the arc of the arcuate portion is centred on the edge of the panel.

3. A hinge according to claim 2, wherein the spade member is provided with resilient detent means adapted to engage with a complementary formation on the socket portion.

4. A hinge according to claim 3, wherein the detent means is mounted on an arcuate finger extending adjacent to one edge of the arcuate portion of the spade member and attached thereto at the end thereof further from the panel.

5. A hinge according to claim 1, wherein the spade member is provided with resilient detent means adapted to engage with a complementary formation on the socket portion.

6. A hinge according to claim 5, wherein the detent means is mounted on an arcuate finger extending adjacent to one edge of the arcuate portion of the spade member and attached thereto at the end thereof further from the panel.

* * * * *